US009253962B2

(12) United States Patent
Gallo et al.

(10) Patent No.: US 9,253,962 B2
(45) Date of Patent: Feb. 9, 2016

(54) POCKET BED PAD WITH PADDED INSERTS FOR CUSTOMIZED PLUSHNESS

(71) Applicants: Sandra Marie Gallo, Cary, NC (US); Michael Thomas Gallo, Cary, NC (US)

(72) Inventors: Sandra Marie Gallo, Cary, NC (US); Michael Thomas Gallo, Cary, NC (US)

( * ) Notice: Subject to any disclaimer, the term of this patent is extended or adjusted under 35 U.S.C. 154(b) by 0 days.

(21) Appl. No.: 13/944,160

(22) Filed: Jul. 17, 2013

(65) Prior Publication Data

US 2014/0373792 A1 Dec. 25, 2014

Related U.S. Application Data

(60) Provisional application No. 61/796,938, filed on Nov. 26, 2012.

(51) Int. Cl.
*A01K 1/035* (2006.01)

(52) U.S. Cl.
CPC .................... *A01K 1/0353* (2013.01)

(58) Field of Classification Search
CPC ..... A01K 1/0353; A01K 1/035; A01K 1/033; A01K 1/0157
USPC ........................................ 119/28.5
See application file for complete search history.

(56) References Cited

U.S. PATENT DOCUMENTS

| 2,032,248 | A | * | 2/1936 | Bins | 119/482 |
|---|---|---|---|---|---|
| 3,889,667 | A | | 6/1975 | Collins | |
| 3,930,497 | A | | 1/1976 | Krebs et al. | |
| 3,998,221 | A | | 12/1976 | Collins | |
| 5,588,393 | A | * | 12/1996 | Heilborn | 119/28.5 |
| 5,662,065 | A | * | 9/1997 | Bandimere et al. | 119/28.5 |
| 5,784,995 | A | * | 7/1998 | Willinger | 119/28.5 |
| 2004/0177814 | A1 | * | 9/2004 | Godshaw | 119/28.5 |
| 2004/0237899 | A1 | | 12/2004 | Fung | |
| 2006/0272581 | A1 | * | 12/2006 | Dunn et al. | 119/28.5 |
| 2006/0272582 | A1 | * | 12/2006 | Dunn et al. | 119/28.5 |
| 2009/0165728 | A1 | | 7/2009 | Swanson | |
| 2010/0077962 | A1 | * | 4/2010 | Arvanites | 119/28.5 |
| 2011/0239946 | A1 | * | 10/2011 | Ogle | 119/28.5 |
| 2013/0247828 | A1 | * | 9/2013 | Tedaldi et al. | 119/28.5 |

FOREIGN PATENT DOCUMENTS

WO 9904721 A1 2/1999

* cited by examiner

*Primary Examiner* — Trinh Nguyen
(74) *Attorney, Agent, or Firm* — Coats & Bennett, P.L.L.C.

(57) ABSTRACT

A pet pocket bed/pad comprising of a hollow flexible shell, top wall, bottom wall, surrounding walls which interconnect the top and bottom wall, fill material is disposed inside, to create a pet bed/pad. Additional compartment is added underneath comprising of three side walls, bottom wall, interconnecting the bottom wall of the upper pet bed, to create a pocket compartment, which is equal or greater, with an opening on one end or side, to allow a solid planar flat surface to be inserted inside, working in combination with the bed/pad, secured with closure to keep the flat surface inside the pocket, which prevents bunching up. Padded inserts comprising of a top and bottom wall, surrounding walls interconnected, will create a pillow of similar size and perimeter, to be inserted inside the interior underneath pocket of the bed/pad, to customize the plushness for additional comfort.

2 Claims, 4 Drawing Sheets

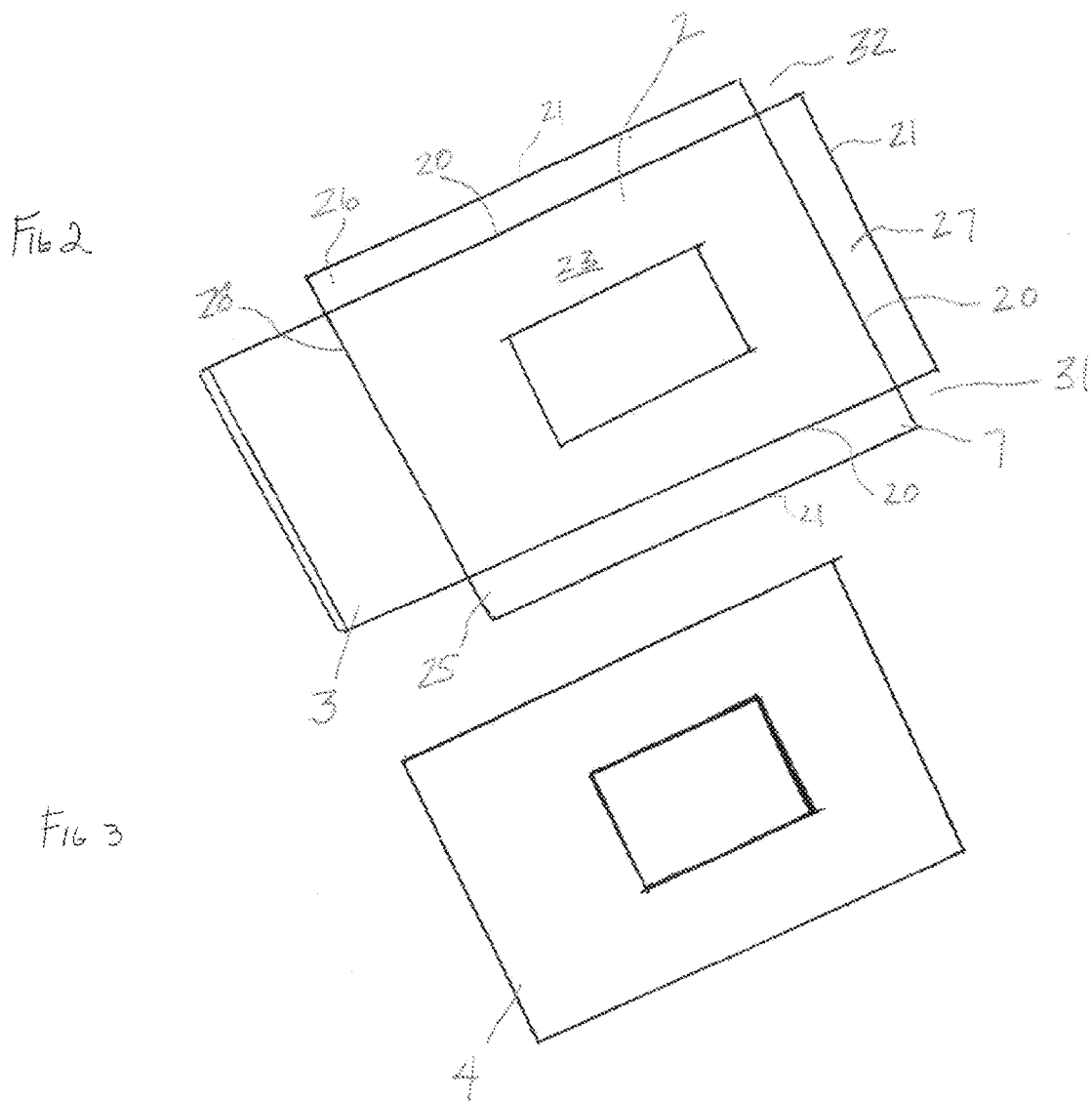

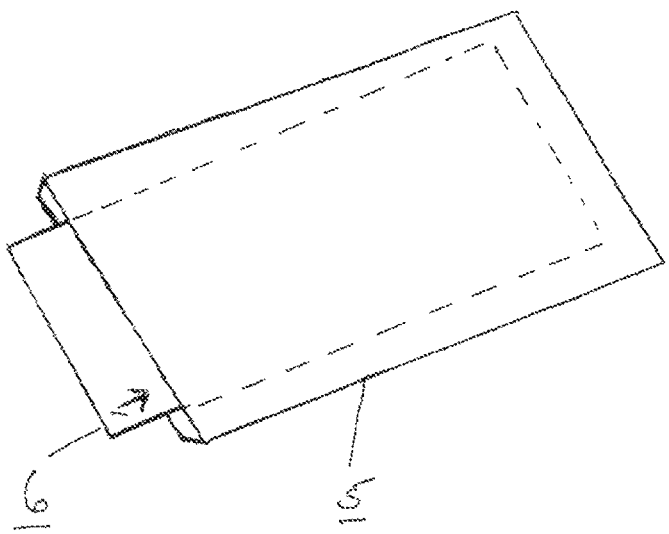

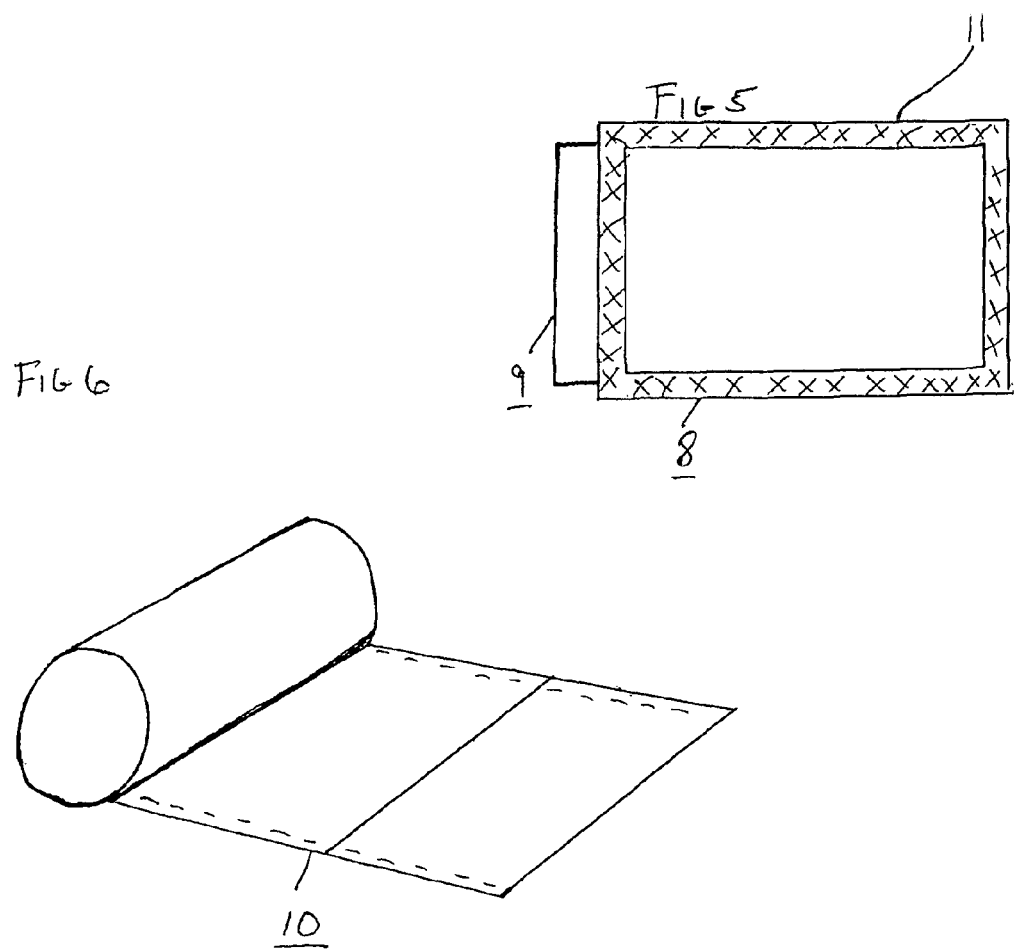

POCKET BED PAD WITH PADDED INSERTS FOR CUSTOMIZED PLUSHNESS

BACKGROUND OF INVENTION

The present invention relates to bedding/padding and more specifically, to bedding for a pet such as a dog. Traditional bedding for dogs is in the form of a cushion filled with fibrous material, which provides an interior cushioning to support the weight of the dog and provide comfort while the pet is laying down.

Pet beds have been around for years and come in all shapes and sizes to provide comfort for pets. Pets instinctively dig and bunch up their bedding to create a "nest" to lay down on as if they were in the wild. Pet owners are constantly flattening out their pets bedding so their pet can lay down comfortably on flat bedding.

Though different pet beds have been available in the marketplace, there has been a need for improvement. This new pet pocket bed design prevents bunching up of bedding and allows pet owners to customize the thickness and plushness of their pets bed to insure their comfort. The pet bed works in combination with a flat rigid surface to keep the bedding flat.

Pet crate beds currently on the market are placed in a pet's crate, on top of the included standard plastic tray pan, which the bed can easily slide and move by the pets movement within the crate, causing the owner to bend or "climb" uncomfortably into the crate to flatten out the bedding for their pet's comfort. This pet pocket bed will resolve this issue and keep the bedding flat.

This new pet pocket bed/pad prevents bedding from bunching up by inserting a flat rigid surface inside a compartment added underneath or inside the pet bed, which keeps the bedding flat and rigid, while allowing pet owners to add plush inserts to customize the plushness of their pets bed.

This Pocket Bed/Pad can also be used in any medical setting, made of one time use plastic with absorbent top, with and not limited to adhesive edges for closure to insure a tight custom fit, with perforated edges for easy tear away removal. The pocket pad will allow an exam table, surgical table, cage tray pan or crate tray to be inserted inside, to keep the pad flat and rigid to prevent bunching up which would keep the pad away from sutures or wounds and allow easy clean up after exams.

DESCRIPTION OF DRAWINGS

FIG. 2 Pocket Bed comprising of the underneath or interior pocket compartment and outer surrounding pillow edges, working in combination with the flat rigid surface sliding inside the pocket compartment of the pet pocket bed, to keep the bed flat and rigid to prevent bunching up of bedding. Pocket Bed with outer surrounding perimeter edges, with fill disposed inside, to create a soft pillow bumper or bolster, which folds upward and lays vertically and horizontally against the pet crate inner walls, with corners that do not overlap but meet, to create a continuous soft surface when placed inside a crate, for the pet to rest against for added comfort.

FIG. 3 Pet Pocket Bed Padded Inserts to be inserted inside the pet bed, to customize the plushness and thickness of the pet bed to insure comfort for the pet.

FIG. 4 Pocket Pad made of plastic sheeting for medical use with cotton absorbent top and perforated edge for easy tear away removal, allows insertion of a rigid flat surface, comprising of, not limited to crate tray pan, cage tray, exam or surgical table, which keeps disposable pad flat and prevents bunching up, to keep pad away from wounds or sutures and easy clean up after exams. Can be used in any medical setting or veterinary use.

FIG. 5 Pocket Pad with perforated edges for easy tear way changing and removal and closure by and not limited to adhesive edges surrounding the flat rigid inserted surface perimeter to insure a snug secure fit, to prevent bunching up and movement.

FIG. 6 Pocket Pad for medical use made in a continuous roll with perforated edges for easy tear away removal, adhesive edges allowing a custom secure fit by wrapping the plastic sheeting around a table or tray pan and attaching the adhesive edges to create a pocket, to prevent bunching up.

DETAILED DESCRIPTION OF INVENTION

Figure 1:
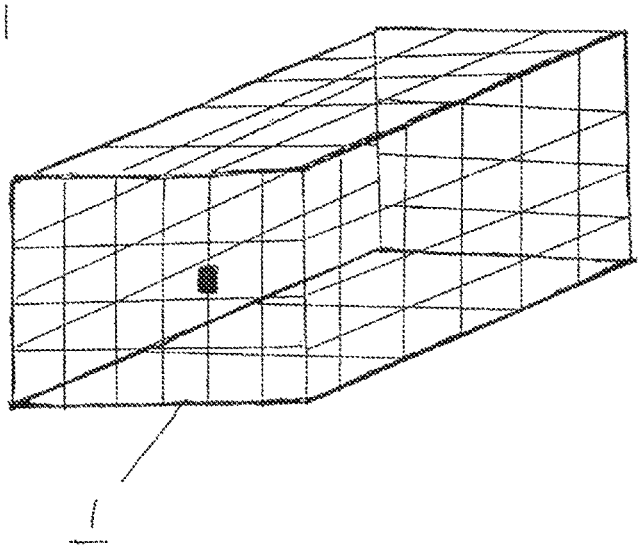
FIG. 1 Pet Crate illustrates the location of the Pet Crate Pocket Bed/Pad when used on crate bottom.

The present invention provides a pet bed comprising of an attached underlying pocket compartment which enables the insertion of a flat planar rigid surface with closure, to keep the rigid flat surface including and not limited to a crate tray pan, inside the pocket, to keep the bed flat to prevent bunching up. Padded inserts can be added to customize the plushness and thickness of the pets bed to insure comfort.

The invention comprises of a bed for a pet which includes a hollow flexible shell made of any material, in any shape or size, having a top wall, bottom wall, and surrounding walls, interconnecting with the top and bottom wall, which can be any size or shape, fill material comprising of polyester, o0tton, recycled bottles, is disposed inside, secured with or without a surrounding seam or tufted, to prevent shifting, to support the weight of the pet above the floor surface or the bottom of a pet crate. Additional surrounding walls equal or greater than, are added to the underlying perimeter of the bed including a bottom wall, to interconnect with the upper pet bed, leaving one end or side open, to create a compartment pocket, to insert a flat rigid surface attaching opposing sides for closure, to keep the rigid surface :locked: inside to prevent movement and bunching up of bedding.

Pocket Bed/Pad works in combination with the flat interior surface to keep the bed rigid which prevents bunching up of the bedding so the pet can lay down comfortably. An outer extending edge of any size or height, and any material, comprising of a seam to separate from the flat bed, surrounds the pocket bed on and limited to all four sides, to form a continuous or partial hollow compartment, with or without closure, for fill material to be disposed inside, to create a padded bumper or bolster. When placed in a crate, the beds outer edge extends upward, the edge corners do not overlap but join together to form a continuous vertical and horizontal padded surface, which rests against the crates inner walls, for the pet to rest against for added comfort.

The padded insert can be made in any shape or size, comprising of a hollow flexible shell made of any material, having a top wall, bottom wall, with or without surrounding walls, interconnecting the top and bottom wall, in which fill material comprising of and not limited to cotton, polyester, synthetic, recycled bottles is disposed inside, with or without a center interior surrounding seam or tufted to prevent shifting of fill, to create a soft plush pillow of similar size and perimeter, to be inserted inside the beds pocket compartment, which is secured with closure. The padded insert works in combination with the pocket bed, to add plushness and thickness to insure the pets comfort.

This new Pocket Bed/Pad discourages chewing by keeping the bedding flat and rigid which is difficult for the pet to lift up to chew. The Pocket Bed with padded inserts will be fully machine washable for easy care.

Pocket Bed/Pad can be used in any medical setting as a one use disposable pocket bed/pad, comprising of waterproof sheeting including and not limited to plastic, with an absorbent top, consisting of a top wall, bottom wall, surrounding walls interconnecting the top and bottom walls, to create a compartment pocket, to insert an exam or surgical table, cage or crate tray pan, with perforated edge for easy tear away removal and adhesive edges for closure, to prevent bunching up, which would benefit recovering pets by keeping the pad away from wounds and sutures while being waterproof to contain pet accidents, which also be used during puppy training allowing easy clean up. Can be used for medical and veterinary use. The pocket bed/pad works in combination with the flat rigid surface to prevent bunching up.

Pocket Bed/Pad can be made in a continuous roll of plastic sheeting with absorbent top, to allow custom fit for various size rigid flat surfaces, with adhesive outer edges for closure to prevent bunching up and perforated edges for easy tear away removal. The sheeting with absorbent top would be able to wrap around various size flat rigid surfaces the adhesive edges would create a pocket by joining the opposing ends, for a custom fit to prevent bunching up.

DESCRIPTION OF PREFERRED EMBODIMENT

Pets instinctively bunch up their bedding before laying down as if they were creating a nest in the wild to lay down on. Pet owners are constantly flattening out their pets bedding so they can lay down comfortably. Pet Pocket bed/Pad FIG. 2 #2 works in combination with a flat rigid surface FIG. 2 #3 consisting of and not limited to a crate tray pan, to be inserted inside the beds underneath pocket FIG. 2 #3 to keep it flat and prevent movement. This pocket pet bed discourages chewing since pets cannot lift the fabric to chew. Pet owners no longer have to bend down uncomfortably to flatten their pets bedding.

The present invention "Pocket Bed/Pad with Padded Inserts" consists of the embodiment of a pet bed FIG. 2 which by inserting a flat rigid planar surface inside the pocket compartment located underneath the bed, FIG. 2 #3 prevents bunching up of the bedding, and allows pet owners to customize the plushness and thickness of their pets bed by adding separate padded inserts FIG. 3 #4 into the underneath pocket FIG. 4 #5, which is closed with any fastener, to keep the padded insert inside FIG. 4 #6 and on top on the inserted flat rigid surface or tray securely, to keep the bedding flat. The bed works in combination with the flat rigid surface to keep the bedding flat.

The pocket pet bed FIG. 2 and inserts FIG. 3 can be any size, shape, any material comprising of a hollow flexible shell, bottom wall, a top wall to engage a pet to lay down on for comfort, surrounding side walls, interconnecting the top and bottom walls, fill is disposed inside, secured with closure.

The Bed FIG. 2 has an added underneath pocket compartment which comprises of a bottom wall, surrounding walls, interconnecting with the bottom of the pet bed, keeping one end or side open, which allows the insertion of a rigid flat planar surface FIG. 2 #3 with closure, to keep the bedding flat which prevents bunching up and can include an outer surrounding edge FIG. 2 #7 of any size or height, located on the top of the pet bed, on surrounding sides, separated or attached to create a compartment, for fill material to be disposed into, to create a surrounding plush padded surface FIG. 2 #7 similar to a bolster or bumper, which can be attached or removable.

These outer edges FIG. 2 #7 when folded upward in a pet crate meet together, not to overlap, creating a continuous surrounding vertical and horizontal padded surface, for the pet to lean against for additional comfort. The outer padded edges FIG. 2 #7 can lay flat when placed outside the crate for added comfort.

Pocket Bed/Pad FIG. 4 can be made for one time use in a medical or veterinary setting FIG. 5, comprising of plastic sheeting #8 with absorbent top, consisting of a top wall, bottom wall, surrounding walls interconnecting the top and bottom walls to create a pocket compartment for exam and surgical tables, crate or cage tray pans, to be inserted inside #9, with adhesive edges to close opposing sides FIG. 5 #11, to keep the pocket pad secure and prevents bunching up, which would benefit recovering pets by keeping the bedding away from wounds and sutures. As shown in FIG. 6 the perforated edges #10 located on the outer sides of the pocket pad will allow easy tear away removal for changing and disposal.

This pocket bed/pad plastic sheeting as illustrated in FIG. 6 with absorbent top can be made in a continuous roll with adhesive edges #11 to allow custom fitting for the insertion of various size tables #9 (FIG. 5), or any rigid surface, similar to a cage or crate bottom tray, by wrapping the sheeting around any size rigid surface for custom fit, opposing adhesive edges #11 would meet for closure and perforated edges will allow easy tear away disposal or changing. The bed/pad works in combination with the flat rigid surface to prevent bunching up.

As illustrated in FIG. 2, a seam 20 extends in proximity to a perimeter of the flexible shell forming one or more edges 7 that extend between the seam and the perimeter 21 and that extend around a central portion 23. The edges 7 are pivotal about the seam 20 and may be adjustable between a flat orientation that are aligned with the central portion 23, and an upright orientation that extend upward above the central portion 23. The edges 7 include opposing first and second lateral side edges 25, 26 and a third side edge 27 that is opposite from the opening 28. The first and second lateral side edges 25, 26 have a length equal to the central portion 23 and the third side edge 27 has a width equal to the central portion 23. A first cut-out corner 31 is located between the first lateral side edge 25 and the third side edge 27 and a second cut-out corner 32 is located between the second lateral side edge 26 and the third side edge 27. In the flat orientation, the perimeter is non-continuous with the perimeter of each of the first and second lateral side edges 25, 26 being spaced away from the perimeter of the third side edge 27. In the upright orientation, the perimeter is continuous with the perimeter of the third side edge 27 abutting against both the perimeters of the first and second lateral edges 25, 26.

We claim:

1. A bed/pad for a pet, comprising:
a hollow flexible shell made of a material, including a top wall to engage the pet to lay down on, a bottom wall to engage a flat floor surface, and surrounding outer walls interconnecting the top and bottom walls to create a first compartment for a fill, not limited to cotton, polyester, recycled materials, to be disposed inside, to create a soft surface for a pet to lay down on for comfort, with an additional second compartment created underneath the first compartment and comprising surrounding side walls, a bottom wall interconnecting to the bottom wall of the first compartment, the second compartment being closed on three sides of the surrounding side walls and an opening that is open along one side to create a pocket, the second compartment also including a closure at the open side;

a seam that extends in proximity to a perimeter of the flexible shell forming one or more edges that extend between the seam and the perimeter and that extend around a central portion, the one or more edges being pivotal about the seam to extend upward above the central portion, the edges comprising opposing first and second lateral side edges and a third side edge that is opposite from the opening, the first and second lateral side edges having a length equal to the central portion and the third side edge having a width equal to the central portion and forming a first cut-out corner between the first lateral side edge and the third side edge and a second cut-out corner between the second lateral side edge and the third side edge such that the third side edge abuts against both the first and second lateral edges when the edges are folded upward relative to the central portion; and a planar rigid member with flat a surface sized to be removably inserted inside and kept in place within the second compartment with the closure, the planar rigid member providing support to the central portion of the flexible shell to keep the first compartment flat and to prevent bunching up and movement to insure comfort, the planar rigid member being positioned within the central portion and away from the one or more edges formed by the seam.

2. A bed/pad for a pet, comprising:

a hollow flexible shell made of a material, including a top wall to engage the pet to lay down on, a bottom wall to engage a flat floor surface, and surrounding outer walls interconnecting the top and bottom walls to create a first compartment for a fill, not limited to cotton, polyester, recycled materials, to be disposed inside, to create a soft surface for a pet to lay down on for comfort, with an additional second compartment created underneath the first compartment and comprising surrounding side walls, a bottom wall interconnecting to the bottom wall of the first compartment, the second compartment being closed on three sides of the surrounding side walls and open along one side to create a pocket, the second compartment also including a closure at the open side;

a seam that extends in proximity to a perimeter of the flexible shell forming edges comprising first and second lateral side edges and an end side edge that extend between the seam and the perimeter and that extend around a central portion, the edges being pivotal about the seam between a flat orientation aligned with the central portion and an upright orientation to extend upward above the central portion, the edges including a first cut out between the first lateral side edge and the end side edge and a second cut out between the second lateral side edge and the end side edge, the cut-outs resulting in the perimeter being non-continuous in the flat orientation and continuous in the upright orientation; and a planar rigid member with flat a surface sized to be removably inserted inside and kept in place within the second compartment with the closure, the planar rigid member providing support to the central portion of the flexible shell to keep the first compartment flat and to prevent bunching up and movement to insure comfort, the planar rigid member being positioned within the central portion and away from the one or more edges formed by the seam.

* * * * *